(12) United States Patent
Petersen

(10) Patent No.: US 6,401,041 B1
(45) Date of Patent: Jun. 4, 2002

(54) AUTOMATED GRAPHICAL REPRESENTATION OF AGRICUTURAL INFORMATION

(76) Inventor: Clayton Petersen, 450 Hwy 7, Excelsior, MN (US) 55331

( * ) Notice: Subject to any disclaimer, the term of this patent is extended or adjusted under 35 U.S.C. 154(b) by 0 days.

(21) Appl. No.: 09/569,222

(22) Filed: May 11, 2000

(51) Int. Cl.[7] .............................................. G06F 19/00
(52) U.S. Cl. ..................................................... 702/5
(58) Field of Search ........................... 702/5, 2; 701/50, 701/208; 706/428, 930

(56) References Cited

U.S. PATENT DOCUMENTS

| | | | |
|---|---|---|---|
| 5,377,102 A | * 12/1994 | Nishiishigaki | .................. 702/5 |
| 5,467,271 A | 11/1995 | Abel et al. | |
| 5,566,069 A | 10/1996 | Clark, Jr. et al. | |
| 5,689,418 A | 11/1997 | Monson | |
| 5,884,224 A | * 3/1999 | McNabb et al. | ................ 702/2 |
| 5,999,650 A | 12/1999 | Ligon | |
| 6,002,984 A | 12/1999 | Aughenbaugh | |
| 6,085,135 A | * 7/2000 | Steckel | ......................... 701/50 |

* cited by examiner

*Primary Examiner*—Donald E. McElheny, Jr.
(74) *Attorney, Agent, or Firm*—Albert W. Watkins

(57) ABSTRACT

An automated graphical representation of agricultural information features entry of agricultural data through an Internet web page, preferably by outside resources such as county extension agents. The data is stored within a temporary table until validated. Once the data is verified, it is transferred to a main database, to be included as a part of the data available for third-party graphical representation. The agricultural data is displayed using colors representative of the status or condition of a characteristic that is being evaluated by an end-user. This is preferably done by selecting one pre-established and uniquely colored layer from several that are available, most preferably with the color corresponding to the status. The unique graphical representation allows a very diverse base of users to quickly and readily ascertain the agricultural information, while simultaneously being able to quickly compare the information from one region against another or against historical norms.

15 Claims, 4 Drawing Sheets

US 6,401,041 B1

AUTOMATED GRAPHICAL REPRESENTATION OF AGRICUTURAL INFORMATION

BACKGROUND OF THE INVENTION

1. Field of the Invention

This invention pertains generally to the field of computer-based agricultural reporting systems. More specifically, the present invention is a Web-based interactive reporting system that provides enhanced functionality, improved reliability, better access, and greater control over the data gathering and reporting functions than heretofore available.

2. Description of the Related Art

Agriculture is the backbone of any civilization. Without sufficient food, the citizens will at first be less productive and less healthy. With further shortages, citizens may revolt and bring down the society. Unfortunately, the basic provision of food has become more and more complex as civilizations have become more advanced and as world population has grown. The days of migrant civilizations or small, isolated farms are past, and most modern nations recognize the need and importance of coordinating the food supply to insure the health and well-being of the people of world.

Because of the importance of agriculture to all modern nations, there has been much interest in systems and methods which can be beneficial to the forecasting and monitoring of agricultural products, agricultural production, and related environmental data. The users of this information are diverse and significant. National governments have a direct interest, as already noted, for the preservation of the civilization and the prevention of uprisings. As a part of this interest, federal assistance is frequently provided to farmers in areas or regions that experience unusual or extreme conditions or that are ravaged by other natural disasters. This federal assistance ensures more complete land utilization than would otherwise occur, since the availability of federal assistance allows farmers to utilize areas that may occasionally be affected by droughts or floods for agricultural purposes. Without the federal assistance, in times of droughts or floods these farmers would otherwise be bankrupt. Yet, these regions that are occasionally affected by either flooding or drought often prove to be important to the overall food supply when general conditions are opposite of these local areas. For example, in times of drought low lying areas such as river flood plains that are often the first to flood may be the only regions to produce bumper crops. In times of wide area flooding, regions that experience droughts may be the only areas producing bumper crops. The assessment by a federal government of what constitutes unusual or extreme conditions can only be made based upon historical data or current information taken across a geographic region which is much larger than the affected area.

Food storage and international imports and exports are also frequently controlled or regulated by a national government. The flow of food in and out of the country will depend upon forecasts or expectations of agricultural production. The correct management of agricultural products has great consequence to the entire nation. Even in very recent history, nations have collapsed due to widespread droughts, floods, and blights. However, with good prediction methods, a nation's government may have sufficient opportunity to take actions to help alleviate an agricultural shortfall and stave off any serious adverse economic impact.

State and local governments often will have interests similar to those of a national or federal government. Once again, it is in the best interests of the state and local governments to insure utilization of all lands suited for beneficial agricultural production. The probability of short-term, quite serious environmental conditions is also much greater for smaller regions than for entire nations. Furthermore, states and local governments may have direct interest in the agricultural data for determining efficacy of various programs such as crop development directed towards the specific climate of a local or state region. Comparative agricultural data may reveal, for example, that an adjacent state, region or locale has better yields or production. This information may then be used to develop better agricultural practices within the local area, through educational programs and agricultural extension assistance, or to encourage research into new crop varieties better suited to the local climate.

A number of diverse businesses also depend upon agriculture as a primary source of revenue. Grain elevators, shipping and freight businesses, machine implement dealers, harvesting services, crop dusters, and agricultural suppliers are only a small sampling of the industries directly affected by current agricultural conditions. Depending upon the locale, even businesses such as financial institutions and retail outlets may be significantly impacted by local current agricultural conditions. These businesses make use of agricultural information in different ways, depending upon the business. For example, a crop duster or other agricultural service provider may be able to determine the status of fields in various localities, and schedule for the provision of services in those localities based upon the status information. So, for example, if a crop status report reveals that the majority of a county will be ready for a particular chemical application in one week, when a farmer within that county calls to schedule services, the crop duster might schedule that farmer for application in one week, expecting to schedule with other farmers in that same county during the same trip. In that way, agricultural service providers can provide their services most economically.

Farmers also have many uses for agricultural information. Among these are comparative evaluations of an individual's practices to those of the entire county, region or state. For example, the benefit of a change to a different hybrid variety might be very difficult to evaluate without the opportunity to compare to similar crops within the county, region or state. In addition, many farmers have some capability to self-store agricultural products or delay the harvest of those products. In the event a farmer determines that a bumper crop is being harvested by other farmers, the farmer may choose to store that particular crop, rather than sending the harvested crop to the marketplace. In the case of livestock, the farmer may simply elect to continue to feed and support the livestock on his farm.

Presently, the information delivered to a farmer through existing channels is the local, state and/or national price for various types and grades of agricultural products or commodities. The largest media channel for this type of information has historically been the radio, which in agricultural areas will normally include a farm report each day that consumes a significant amount of time. The farm report often includes an audible presentation of current prices and values for most farm products. This source of agricultural information has several drawbacks, not the least of which is the need to be listening to the radio at the right time. Furthermore, it is hard to compare the local values with values found throughout the state or region or to historical values when the data is presented through the radio. These radio broadcast farm reports, instead of being convenient, typically require a farmer to devote full time and attention to the broadcast, and to keep meticulous notes for future reference. What is missing from this broadcast system is a way for diverse users that range from federal bureaucrats to non-agricultural business owners to quickly get important information, while still providing a level of detail adequate to satisfy the needs of a single farmer looking for detailed information specific to his particular agricultural product.

Rather than advancing the assembly and presentation of agricultural data to address the needs of these diverse users, technology to date has focused much more on tools designed solely for farmers, agronomists and dealers directly assisting those farmers. For example, in U.S. Pat. No. 5,566,069 to Clark, Jr. et al and incorporated herein in entirety by reference, a hand-held computer is used by each participating farmer for the collection of field data. This data stored in the hand-held computer is then transferred to a desktop PC which may be located, for example, in the farmer's home or office. From there, the data is transmitted in batch mode through a mail-type system such as MCI-Mail, and used to assemble a master database. The type of data that is collected includes field operations and daily weather data. However, the statistical analysis and reporting available in the Clark system does not address the needs of the diverse range of agricultural data users that are noted herein above, nor are the displays optimized for rapid loading and display by the user. Furthermore, the data that is being collected is restricted to soil types, crops, farm operations such as tilling, cultivating, etc., various chemicals applied, and diseases and infestations which are encountered, which is specific to the needs of a farmer, such as reporting to the EPA and selecting particular fertilizers or herbicides.

In U.S. Pat. No. 5,689,418 to Monson, an agricultural communication network is disclosed for gathering agronomic data pertaining to specific soil types and conditions, which is then used by an agronomist or soil scientist to generate reports or recommendations for the most effective farming techniques. Data such as the soil type, soil conditions, fertilizer levels and the yield are passed through the Internet to a middle level dealer system, and finally from multiple dealers to a master database used by the agronomist for evaluation. However, like the Clark patent, this method is once again directed to relatively limited needs specific to a farmer, such as selecting particular chemical applications.

What is needed then is an agricultural reporting system which is capable of providing diverse agricultural information to a very diverse set of users in a manner which will be easily understood and readily used by all.

SUMMARY OF THE INVENTION

In a first manifestation, the invention is a method for agricultural collection and reporting. The method includes the steps of creating a master database for storing agricultural data; providing a temporary table which acts as a repository for data; dividing a geographic region into a plurality of reporting units; generating an outline for one of the reporting units; collecting agricultural data describing an agricultural characteristic of the reporting unit into the temporary table; transferring agricultural data from temporary table to master database; receiving a query about one of the reporting units; retrieving agricultural data from the master database; converting the agricultural data to a color value; and displaying a reporting unit filled with the color.

In a second manifestation, the invention is an apparatus for agricultural data collection and agricultural information reporting to a client through the Internet. The apparatus has an Internet gateway which couples to agricultural data passing through the net. In the data collection portion of the apparatus, a temporary repository stores a portion of the data passing through the gateway, where a means evaluates the probability for errors within the stored data and indicates that probability. A means alters the data responsive to the probability indicated by the evaluating means. A permanent database stores the altered data. In the reporting portion of the apparatus, a geographic area is divided into outlined reporting units. A query processing unit converts input from a client into database queries and provides database output responsive to those queries. A means converts the database output into a colored display of the outlined reporting units, for easy review by the client.

OBJECTS OF THE INVENTION

A first object of the invention is to provide an agricultural reporting system which is capable of providing diverse agricultural information. A second object of the invention is to provide the information to a very diverse set of users in a manner which will be easily understood and readily used by all. A third object of the invention is to enable reporting of flexibly defined regions, depending upon the needs of each particular user. An additional object of the invention is to enable data to be input from a number of sources. Yet another object of the invention is to enable the input data to be verified prior to posting or combining with the main database. A further object of the invention is to automate as many functions and capabilities as reasonably possible, to reduce the burden of generating and reporting the data. Another object of the invention is to represent a very large amount of data in a format which quickly transfers that information to the user, while preserving simple or one-step access to greater levels of detail or more specific information. These and other objects are achieved in the present invention, which may be best understood by the following detailed description and drawings.

DESCRIPTION OF THE PREFERRED EMBODIMENT

Figure 1:
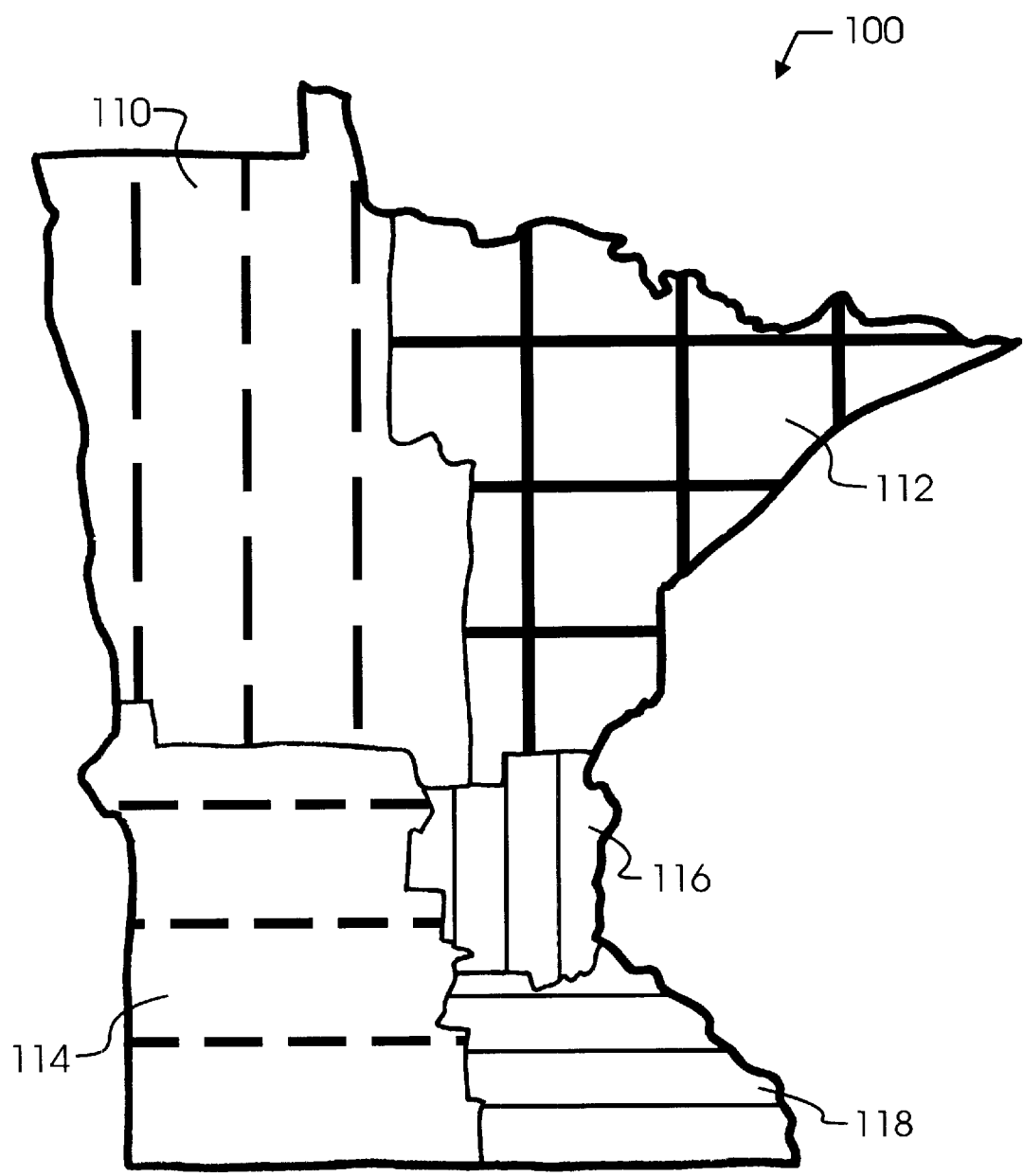
FIG. 1 illustrates a preferred embodiment graphical representation of agricultural information, assembled and colored by region within the state of Minnesota.

A preferred embodiment color graphical representation 100 of agricultural information is illustrated by black and white line drawing in FIG. 1. A state, in this case Minnesota, is divided up into five regions 110–118, and each region is assigned a color based upon the status of a particular agricultural condition being represented. For example, if FIG. 1 were to represent soil moisture content, then as illustrated the northeast region 112 of the state might be shaded black, representing, for example, a drought severe enough to be fatal to most crops. Southwest region 114 might be represented by a gray color, which can be interpreted for example to suggest a nearly fatal drought. Central region 116 might be colored red as shown, to represent a dangerous drought that is threatening crops, though not yet fatal to production and harvest. Southeast region 118 might be illustrated by a blue color, which might, for example, be suggestive of a perfect or slightly excessive moisture level, while the purple of region 110 might be used to represent flooding to the degree of once again threatening the crops. With a single glance, the moisture status throughout the state can be readily ascertained, even by those who are observing the data for the very first time.

While the particular colors are not essential to the workings of the invention, there are several embodiments that are more preferred. First of all, the colors should, wherever possible, transition smoothly from one color to the next, and most preferably be unambiguous in terms of what status a particular color represents. For example, in the cases of green, yellow and red when referring to crop health, green most preferably suggests healthy crops, red most preferably represents a serious threat to the crop production, and yellow most preferably represents crops stressed due to moisture, disease or other problem that are between red (seriously threatened) and green (healthy). In both the color spectrum and the health of the crop, yellow falls between red and green. Secondly, the colors selected will most preferably be pure colors used within common web browsers, which significantly speeds the display of those colors and reduces the amount of information that must be exchanged between client and server.

Figure 2:
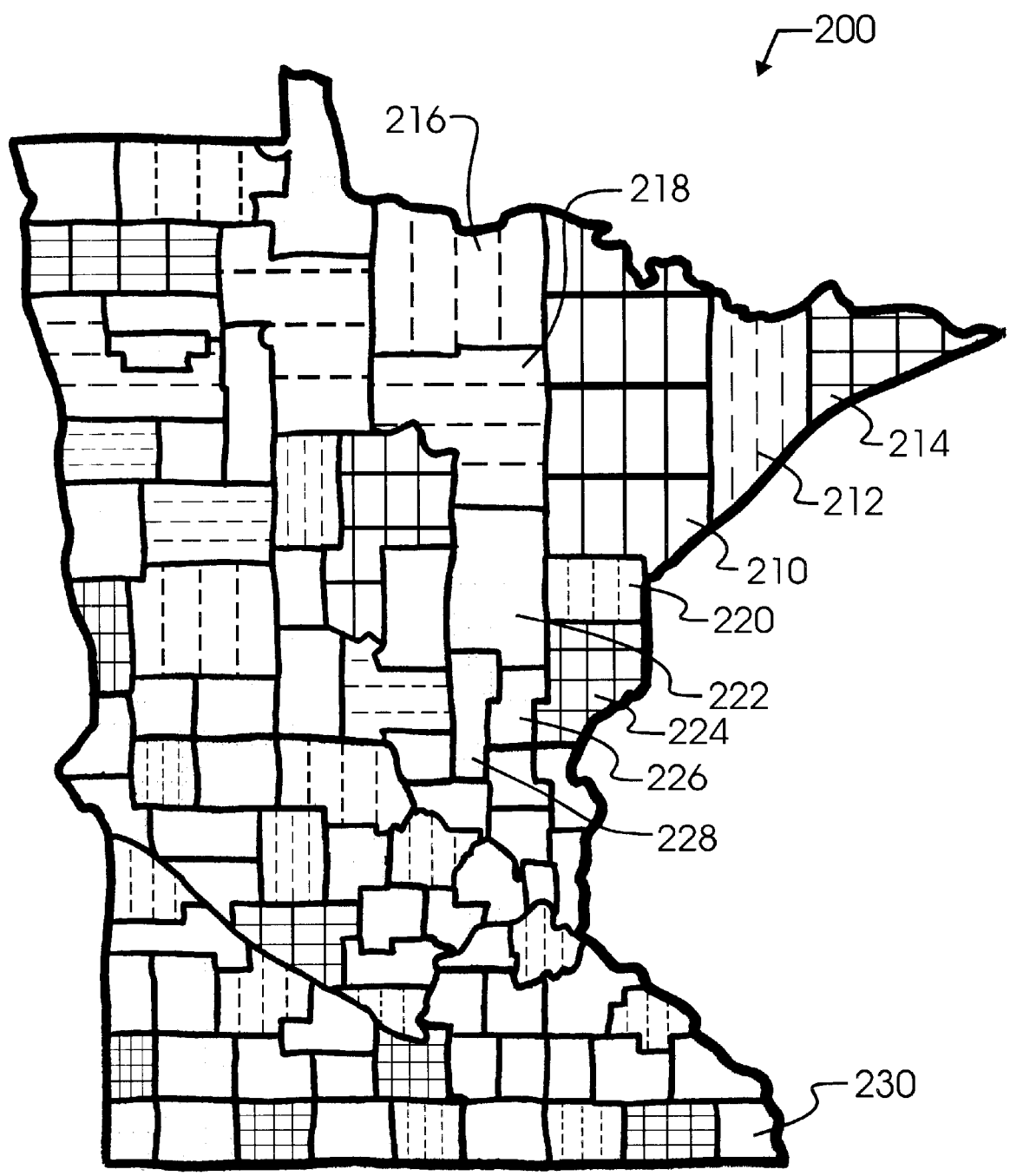
FIG. 2 illustrates a preferred embodiment graphical representation of agricultural information, assembled and colored by county within the state of Minnesota.

FIG. 2 illustrates a second graphical representation 200 that includes more detail than representation 100, this time with discrete information displayed for each county. For example, the northeast region 112 of FIG. 1 actually comprises 10 different counties 210–228. In representation 200, each of these counties may be displayed separately from each other and may thereby be visually compared to each of the surrounding counties. As also illustrated in FIG. 2, there may be times when some or all of the counties have failed to report one or more parts of the data necessary to produce representations. As shown in FIG. 2, counties such as county 230 that fail to report the data will preferably be left transparent or be filled with a solid color such as white to signify that there is no reported data.

FIGS. 1 and 2 illustrate divisions of land area that are at the county and regional levels within a state. However, there is no limitation on the possible groupings or divisions, and so a multi-state or even multi-nation region will most preferably be available for display using the same grouping techniques as shown by the regions 110–118 of FIG. 1. Nevertheless, the county divisions of FIG. 2 are the most preferred smaller size groupings, since many areas have county governments that are involved in the agricultural process, such as county extension agents or agricultural field agents whose job is to survey the current agricultural conditions within the county and report that information to all appropriate groups and government agencies. These field agents, with the preferred methods of the present invention, become the reporting mechanism to report on the various conditions within their specific county. While it may be possible to obtain more localized data directly from individual farmers, perhaps even down to the individual farm or tract, such information is of much more limited value to all users of these representations, except for the particular farmer who owns or works that particular tract. That level of display adds enormously to the data load upon the system, and also to the amount of time necessary to retrieve information, while simultaneously detracting from the broad and diverse base of potential users. A crop duster will not want to wade through John Doe's field data to get crop status information. Likewise, John Doe will not want to risk loss of proprietary information relating to his agricultural practices. Consequently, county level data as shown in FIG. 2 is the most preferred smallest size increment for presentation. The use of regions within a state and reporting for an entire state is also preferred, to provide informative reports associated with the larger political boundaries of the states. Finally, multi-state regional reporting can provide early warnings of impending and significant shortages of crops or animal feed, and this early warning may provide the necessary advance notification to enable a state or federal government to enlist the aid of other agricultural regions or nations that are not so adversely affected.

A variety of data will most preferably be gathered for use within the present invention. This data will vary somewhat depending upon the type of crop under review, but will contain common information as well. For example, in the case of corn the database will most preferably include data fields within each record for the date of the entry; county ID; state ID; crop stage; length of ears; rows around; soil moisture; crop condition; and percent of the county planted. Additional information in the form of comments that may be helpful in describing the current county conditions will also most preferably be accepted in a comment field. For soybeans, the data fields that are common to corn include the date of entry, county ID; state ID; crop stage; soil moisture; crop condition; percent of the county planted and comments. However, soybeans will most preferably not include length of ears and rows around, but will instead include the number of pods and pod fill. With each different agricultural product there may be one or more fields that are unique to that product, and a collection of common data fields. For those familiar with object oriented programming and where an object oriented database is used, the agricultural commodity might be a class, with each particular crop or product inheriting the class fields and then adding one or more unique data fields.

Additional information will most preferably be stored and be available for reports. This information might, for example, include notes or comments from each agent that amend or qualify the data which is presented graphically. For example, an agent may note that a particular crop is about to be harvested, even though none or only a negligible amount of that crop has been harvested at the time of the report. These types of comments will most preferably be accessible through a click on a particular county of interest, which will in turn activate a new display screen or window which provides more detailed agronomic data, where such data is available. Some additional information will also typically be provided directly with the information displayed as FIGS. 1 and 2 herein, such as the region, state or county name, a key identifying range limits for a particular color code, and other similar helpful or beneficial information.

Figure 3:
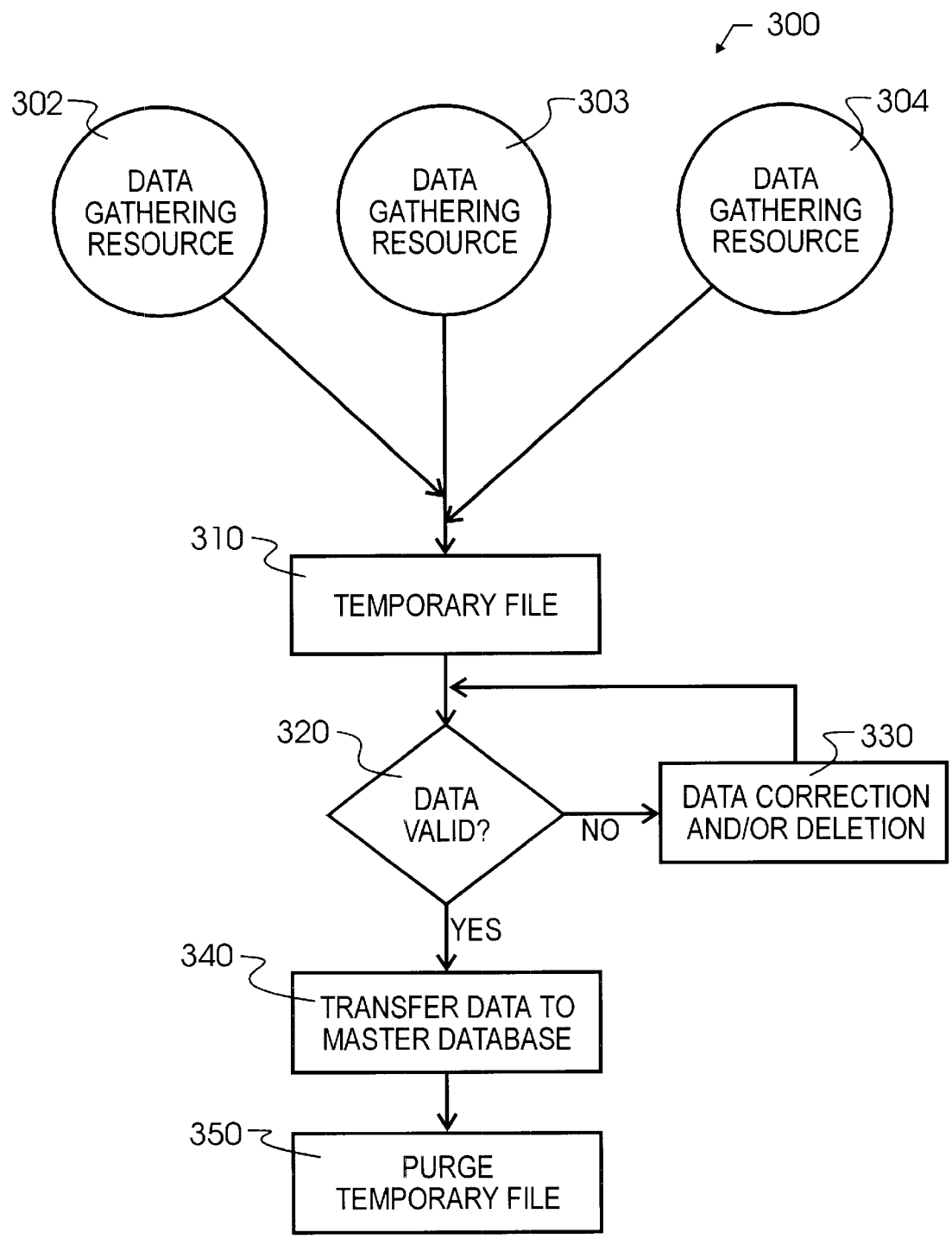
FIG. 3, illustrates the preferred method of loading the database.
Figure 4:
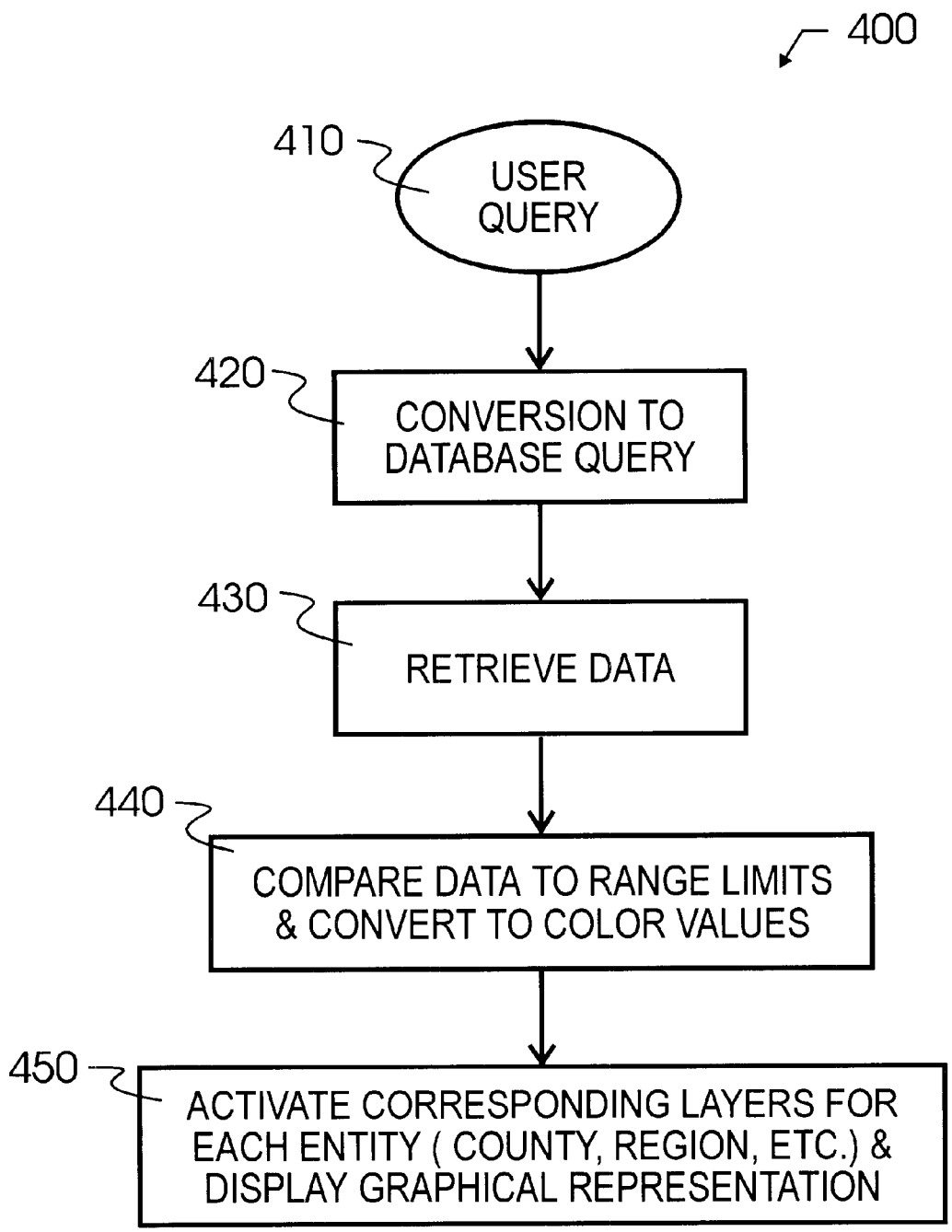
FIG. 4 illustrates the preferred method of retrieving data from the database and converting the data into graphical information at a user terminal.

The data, as aforementioned, will most preferably be collected through agronomists, agricultural extension agents and other similar data gathering resources which are identified as data gathering resources 302 and 304 in FIG. 3. However, the particular sources 302, 304 for data are not critical, and a variety of data gathering resources may be utilized such as is otherwise known in the art. These data gathering resources will most preferably be provided with password or other similar authentication, such as would be expected to log in to a secure portion of a web site. The secured access will most preferably be limited by a system administrator to allow the data gathering resource to only add data to regions or areas that correspond to the resource's specified locality or authority.

Data which is gathered by the various resources is most preferably not directly entered into the main database. Instead, the data is stored to a temporary table or transaction file 310, where the data can be reviewed and validated. Most preferably, various techniques such as range or limit checking, statistical process control (SPC) and other similar analytical tools will be employed at step 320 to provide automated assistance to an operator or system administrator during the verification of data. If the data is incorrect, the administrator will have the option of deleting the data or attempting to restore it at step 330. Once the data has been verified, and corrected by the administrator if necessary, the data will most preferably be transferred into the main database at step 340. This new information will then be permanently archived, and the temporary table or transaction file is purged at step 350. Care must be taken in interactive, always-on systems such as this preferred embodiment that only records that have actually been transferred are purged.

Once stored in the main database, data may be accessed as shown in method 400 with queries 410 to the database. The queries 410 are most preferably simple clicks on buttons or boxes that identify particular data that a user wishes to view. For more specific and detailed information, a query may be the result of several layers or levels of pages or menus, thereby preserving the opportunity for specialized or complex data analysis. The user query 410 must be interpreted by the software to a corresponding database query and returned report format, as shown in step 420. The data resulting from these queries will most preferably evoke highly informative reports to the user query. As aforementioned, data can be grouped during retrieval not only by county, but also by larger regions. Furthermore, depending on the grouping, specific averages, weighting, etc can be performed and stored for the different groups. Those working outside of or less versed in the agricultural industry can, with the preferred embodiment of the present invention, readily select basic data queries such as regional crop status, and receive exceptionally quickly delivered fully colored representations that allow instant recognition of crop status throughout the region, both as compared to historical norms and as compared to adjacent localities.

When the database is queried in step 410 and returns data in step 430, this data is not directly displayed upon the screen. Such direct data presentation gives the viewer no tools for historical assessment or for rapid comparison to surrounding areas. Instead, a viewer would have to spend significant time and energy interpreting the meaning of the numbers on the page. The present invention and preferred embodiments overcome this limitation by passing the data through a look-up table in step 440, where a color for a region upon a map is selected based upon the data value with respect to historical norms and deviations. The colored map of the present invention, were it to be all red for example and illustrating crop health, might at a glance suggest to a viewer that there were many crops in serious danger. This will be quickly ascertained because the colors are determined based upon historical averaging, not upon the variances that might be occurring within this single data collection period.

The display of colors in the most preferred embodiment of the present invention preferably does not involve the generation and transmission of a complete bit-map every time a different color for a discrete region needs to be generated. Instead, a vector outline is most preferably created for each county or region. The county may then be colored in step 450 either by specifying a fill color using the county as an outline container, or by initially creating a multi-layer map that is made up of as many layers as there are colors to choose from. Each county color can then be chosen by using ranges to automatically select the appropriate layer for the county or region. Please note that when multiple states are displayed, that the states will also have vector outlines stored which may be color filled or layer selected, just as the counties are so colored. To convert the data on a pixel-by-pixel basis could drag down even the fastest desktop computers and Internet connections. The preferred method of vector outlines once again serves the primary objectives of the present invention by quickly and efficiently providing key information to a diverse group of users.

In a preferred embodiment method of use, a data user will access an Internet home page and will enter an appropriate password to gain access to the database information. The user will next select both the data of interest, and also the region into which the data will be displayed in step 410. Clicking on a single county will most preferably initiate a display of county specific data or information, including such data fields as the comment field. This web-based gathering and reporting allows for near real-time data reporting on a global basis, and in combination with vector mapping ensures the system does not get undesirably loaded down during periods of peak demand.

Since the data is permanently archived within the database, various additional reporting may be implemented, such as graphing, statistical analysis, etc. The database information should, however, be well protected and secured. The particular database type or structure is not critical to the invention, though well-known SQL or OODB (Object-Oriented DataBase) models are preferred for their speed and robustness.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, while in the most preferred embodiment described herein, the data represents actual field data, the method and apparatus of the invention are also contemplated for use with predictive or forecasting data as well. Such a system has application to those persons described herein above who might be responsible for governmental or administrative roles, such as by changing export or import controls responsive to the predicted needs of agriculture. The scope of the invention is set forth and particularly described in the claims hereinbelow.

I claim:

1. A method for agricultural collection and reporting, comprising the steps of:

creating a master database for storing agricultural data;

providing a temporary table which acts as a repository for said agricultural data;

dividing a geographic region into a plurality of jurisdictional boundaries each having unique governmental jurisdiction;

generating an outline representative of at least one of said plurality of jurisdictional boundaries;

collecting agricultural data describing an agricultural characteristic of said at least one of said plurality of jurisdictional boundaries into said temporary table;

verifying the accuracy of said collected agricultural data in said temporary table;

transferring said verified agricultural data from said temporary table to said master database;

receiving a query about said at least one of said plurality of jurisdictional boundaries;

retrieving said verified agricultural data from said master database;

converting said retrieved agricultural data to a color value representative of an agricultural condition corresponding to said retrieved agricultural data; and displaying said outline representative of said at least one of said plurality of jurisdictional boundaries filled with said color value.

2. The method for agricultural collection and reporting of claim 1 wherein said step of collecting further comprises computer-to-computer transfer of said data from a data gathering resource to said temporary table.

3. The method for agricultural collection and reporting of claim 2 wherein said data gathering resource comprises a governmental agent having jurisdiction within said jurisdictional boundary.

4. The method for agricultural collection and reporting of claim 1 wherein said color value is a pure browser color.

5. The method for agricultural collection and reporting of claim 1 wherein said step of generating outlines further comprises generating a vector outline of said one of said plurality of said reporting units.

6. The method for agricultural collection and reporting of claim 1 wherein said step of generating an outline further comprises generating a bitmap outline of said at least one of said plurality of said jurisdictional boundaries.

7. The method for agricultural collection and reporting of claim 1 wherein said step of dividing geographic regions further comprises county, state, regional and nation al reporting units.

8. An apparatus for agricultural data collection and agricultural information reporting to a client through the Internet, comprising:

an Internet gateway which couples said apparatus to agricultural data passing through said Internet;

a temporary repository for a first portion of said data passing through said Internet gateway;

a means for evaluating the probability for errors within said first portion of said data and providing an output representative of said probability;

a means for altering said first portion of said data responsive to said output from said evaluating means;

a permanent database for storing said altered first portion of said data;

a representation of a geographic area divided into outlined reporting units;

a query processing unit for converting input from said client into database queries and providing database output responsive to said database queries; and a means for converting said database output into a colored display of said outlined reporting units.

9. The apparatus for agricultural data collection and agricultural information reporting of claim 8 wherein said reporting unit outlines are represented by vectors.

10. The apparatus for agricultural data collection and agricultural information reporting of claim 9 wherein said means for converting said database output selects a fill color for filling inside said vector outlines.

11. The apparatus for agricultural data collection and agricultural information reporting of claim 9 wherein said means for convening said database output selects a layer of vector-outlined color corresponding in display placement to said vector outlines and containing a color representative of said database output.

12. The apparatus for agricultural data collection and agricultural information reporting of claim 8 wherein said means for converting said database output fills said outlined reporting units with a color representative of said database output.

13. A method for agricultural forecasting which enables a wide range of diverse users to forecast agricultural conditions with improved reliability using existing data streams, comprising the steps of:

dividing a geographic region into a plurality of jurisdictional boundaries, each having unique governmental jurisdiction;

creating a database for storing agricultural data;

collecting agricultural data describing an agricultural characteristic of said at least one of said plurality of jurisdictional boundaries;

transferring said collected agricultural data to said database;

receiving a query about said at least one of said plurality of jurisdictional boundaries;

retrieving said collected agricultural data from said database responsive to said query;

converting said retrieved agricultural data to a color value representative of an agricultural condition corresponding to said retrieved agricultural data; and displaying said color value representative of said agricultural condition within said at least one of said plurality of jurisdictional boundaries; and forecasting an agricultural condition responsive to said color value display.

14. The method of claim 13 further comprising the step of generating an outline representative of at least one of said plurality of jurisdictional boundaries.

15. The method of claim 13 wherein said representative color value represents a relation to historical averages for said at least one of said plurality of jurisdictional boundaries.

* * * * *